(12) United States Patent
Eris

(10) Patent No.: US 11,039,046 B2
(45) Date of Patent: *Jun. 15, 2021

(54) SYSTEM OF AUTOMATED SCRIPT GENERATION WITH INTEGRATED VIDEO PRODUCTION

(71) Applicant: Kayihan Eris, Griffith (AU)

(72) Inventor: Kayihan Eris, Griffith (AU)

( * ) Notice: Subject to any disclaimer, the term of this patent is extended or adjusted under 35 U.S.C. 154(b) by 0 days.

This patent is subject to a terminal disclaimer.

(21) Appl. No.: 16/823,473

(22) Filed: Mar. 19, 2020

(65) Prior Publication Data

US 2020/0220995 A1 Jul. 9, 2020

Related U.S. Application Data

(63) Continuation of application No. 16/016,724, filed on Jun. 25, 2018, now abandoned, which is a continuation-in-part of application No. 14/917,417, filed as application No. PCT/AU2014/000880 on Sep. 8, 2014, now Pat. No. 10,008,239.

(30) Foreign Application Priority Data

Sep. 8, 2013 (AU) ................................ 2013903435

(51) Int. Cl.
  *H04N 5/222* (2006.01)
  *H04N 5/77* (2006.01)
  *G11B 27/031* (2006.01)

(52) U.S. Cl.
  CPC ......... *H04N 5/2228* (2013.01); *G11B 27/031* (2013.01); *H04N 5/2222* (2013.01); *H04N 5/77* (2013.01)

(58) Field of Classification Search
  None
  See application file for complete search history.

(56) References Cited

U.S. PATENT DOCUMENTS

| 10,008,239 B2 * | 6/2018 | Eris ..................... H04N 21/2743 |
| 2005/0181765 A1 * | 8/2005 | Mark ..................... G06Q 10/10 455/411 |
| 2009/0232357 A1 * | 9/2009 | Angell ............... G06K 9/00771 382/103 |

(Continued)

*Primary Examiner* — Eileen M Adams
(74) *Attorney, Agent, or Firm* — Mark M. Friedman

(57) ABSTRACT

Disclosed is a method of automated script generation with integrated video production; said method comprising assembling a script comprising a series of steps for a video production; communicating the series of steps of the video production to a central production management application; associating a digital input output device with a video acquisition device; communicating selected ones of the steps in production to said digital input output device; actuating said video acquisition device so as to give effect to said selected ones of said steps; communicating at least video content thus acquired by following said steps to said production management application; integrating said video content thus acquired with content derived by giving effect to others of said steps thereby to produce resultant video output content.

Also disclosed is a system of automated script generation with integrated video production; said system including a server; a plurality of content contributors.

22 Claims, 9 Drawing Sheets

(56) References Cited

U.S. PATENT DOCUMENTS

| | | | |
|---|---|---|---|
| 2012/0311448 A1* | 12/2012 | Achour | G11B 27/34 |
| | | | 715/723 |
| 2013/0278635 A1* | 10/2013 | Maggiore | G06T 19/006 |
| | | | 345/633 |
| 2014/0056576 A1* | 2/2014 | Miura | H04N 21/2668 |
| | | | 386/284 |

* cited by examiner

SYSTEM OF AUTOMATED SCRIPT GENERATION WITH INTEGRATED VIDEO PRODUCTION

TECHNICAL FIELD

The present invention relates to the field of production of video and audio content and more particularly to the production of video and audio content utilising automated assistance.

BACKGROUND

With the prevalence of video enabled cameras, high quality consumer video recorders and the closing gap between professional quality and consumer quality video production equipment, more and more users are looking for ways to produce their own versions of video that captures important events and occasions.

While the equipment enables professional quality recording of video and audio, the ability to handle the equipment professionally and to script and produce professional looking video requires more than good equipment. Know how is needed.

Another feature of professional quality videos is the ability to capture events from many different angles involving multiple cameras and often multiple operators.

Generally scripts that outline how an event or occasion should be shot are produced on-the-fly or remain the intellectual property of professional video producers, thereby limiting the opportunity for non professional users to produce good quality video.

Also when a script is produced it often needs to be modified based on the resources available to shoot the event. For example having two cameras to shoot an event has more limitations than a four camera shoot where events happen in real time and cannot be staged or reproduced, as in the case of a newly married couple saying "I Do".

The know how to produce clever, interesting and professional looking video is available but to date it has not been placed in an automated system that allows a script to be generated from a master script template that takes into consideration the various known factors involved with capturing an important event or occasion and then modified for use with a known number of camera's, operators and other resources.

The described invention is designed to address these issues.

It is an object of the present invention to address or at least ameliorate some of the above disadvantages or provide a useful alternative.

NOTES

The term "comprising" (and grammatical variations thereof) is used in this specification in the inclusive sense of "having" or "including", and not in the exclusive sense of "consisting only of".

The above discussion of the prior art in the Background of the invention, is not an admission that any information discussed therein is citable prior art or part of the common general knowledge of persons skilled in the art in any country.

SUMMARY OF INVENTION

Accordingly, in one broad form of the invention, there is provided a system of automated script generation with integrated video production; said system including a server; a plurality of content contributors; at least one activity output device in association with at least one content acquisition device.

Preferably the content acquisition device is a video camera.

Preferably the content acquisition device further includes audio acquisition capability.

Preferably the at least one activity output device is integrated with the at least one content acquisition device.

In yet a further broad form of the invention there is provided a method of combining preprepared video production content with video content acquired in real-time; said method comprising storing a selection of preprepared video production content on a server; associating a digital input output device with a video acquisition device; communicating at least portions of said preprepared video production content to a central production management application; communicating steps in production to said digital input output device; actuating said video acquisition device so as to give effect to at least some of said steps; communicating at least video content thus acquired by following said steps to set production management application; combining said video content thus acquired with said at least portions of said preprepared video production content thereby to produce resultant video output content.

Preferably only selected ones of said steps are given effect by said acquisition device.

BRIEF DESCRIPTION OF DRAWINGS

Embodiments of the present invention will now be described with reference to the accompanying drawings wherein.

DESCRIPTION OF EMBODIMENTS

First Preferred Embodiment

Disclosed is an example embodiment of a system to allow users to use professionally produced scripts for an event or occasion to produce their own videos. The system includes the ability to define how many cameras and contributing operators are available and support information to help a producer coordinate and capture the content as per the script directions. The system also assists the producing user in editing and refining the collected content as per the script outline and publishing it as a finished video production.

Figure 1:
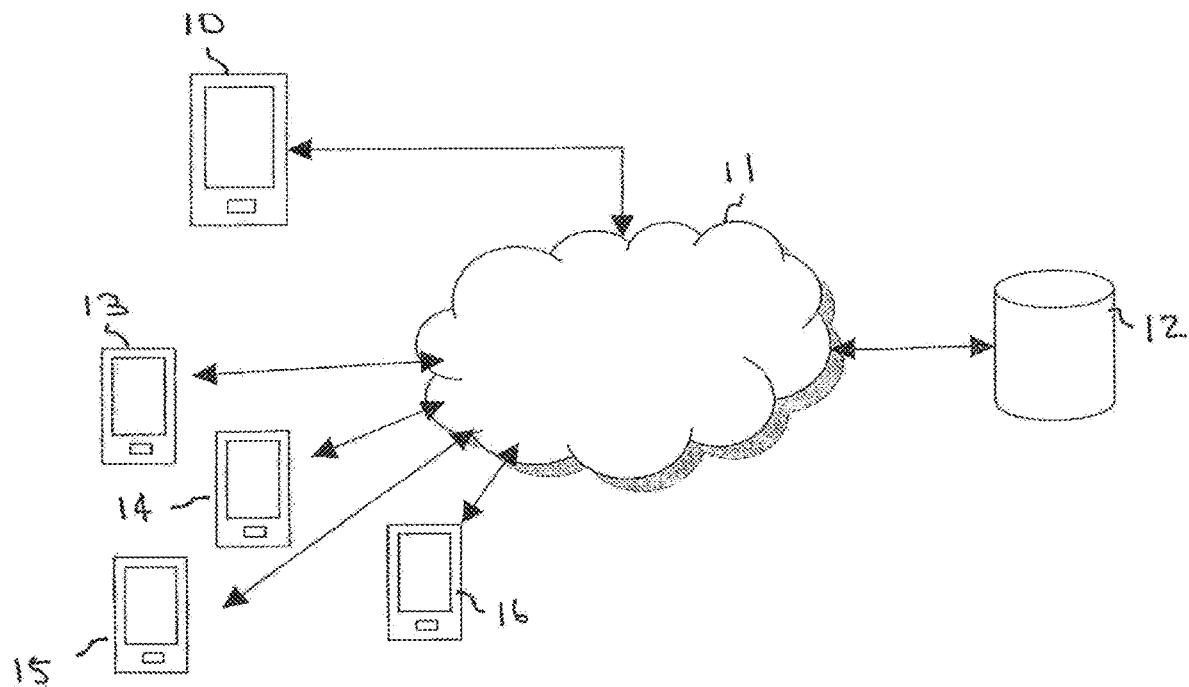
FIG. 1—Main components of example embodiment

FIG. 1 discloses the main components of the example embodiment. These include a device used by the publisher of the video 10, devices in use by contributing operators and content producers 13 14 15 16. These are all connected over the Internet to a video production server 12, which manages content produced by contributor's devices and stores it for future compilation according to a script selected by the producing user 10.

The devices may be used for content generation, but also may be used by the users to interact with the video production server. For example shots or tasks related to the production schedule as defined by the script could be communicated and coordinated through an application on these devices.

Figure 2:
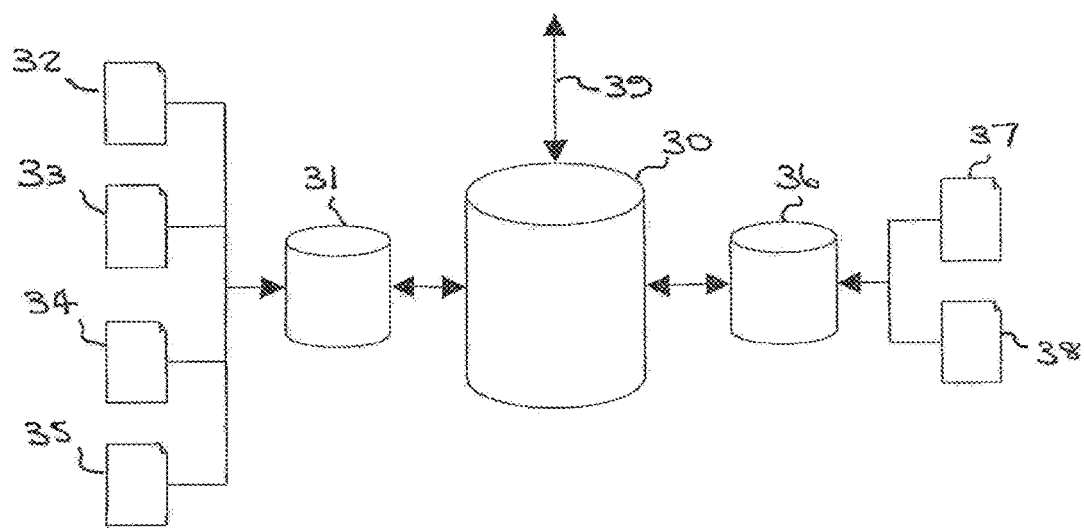
FIG. 2—Main components of Video Processing Server

FIG. 2 discloses key components of the video production server of the example embodiment. A central production management application 30 is connected to a content management system 31 that is in turn connected to and has access to all the content made available or produced for the video being produced 32 33 34 35.

A series of professionally written or supplied script templates 37 for a wide range of events or occasions, such as but not limited to weddings, anniversaries, graduation or holidays is produced and stored for use by the users of the system 37. These script templates have been written in such a way so as to accommodate a wide variety of locations, weather and other factors. They have also been written to accommodate a varying level of access to equipment, operators and operator skill levels.

By becoming a user of the system a producing user can use the script template of their choice 37 and produce a customized script using their own additional information 38. By defining the names of contributing operators, the equipment they have available and their date availability as well as other factors such as but not limited to anticipated weather and location details, the producing user can craft their own script using the script management system 36.

The central production management system 30 uses the script management system 36 and the content management system 31 to manage the process of helping a producing user collect, collate and edit content and then edit, compile and publish the finished result. The main server 30 also communicates with all users by means of the Internet 39 and also uses the Internet to publish the finished video to a publishing location or site such as but not limited to YouTube or Vimeo when it is finished.

Figure 3:
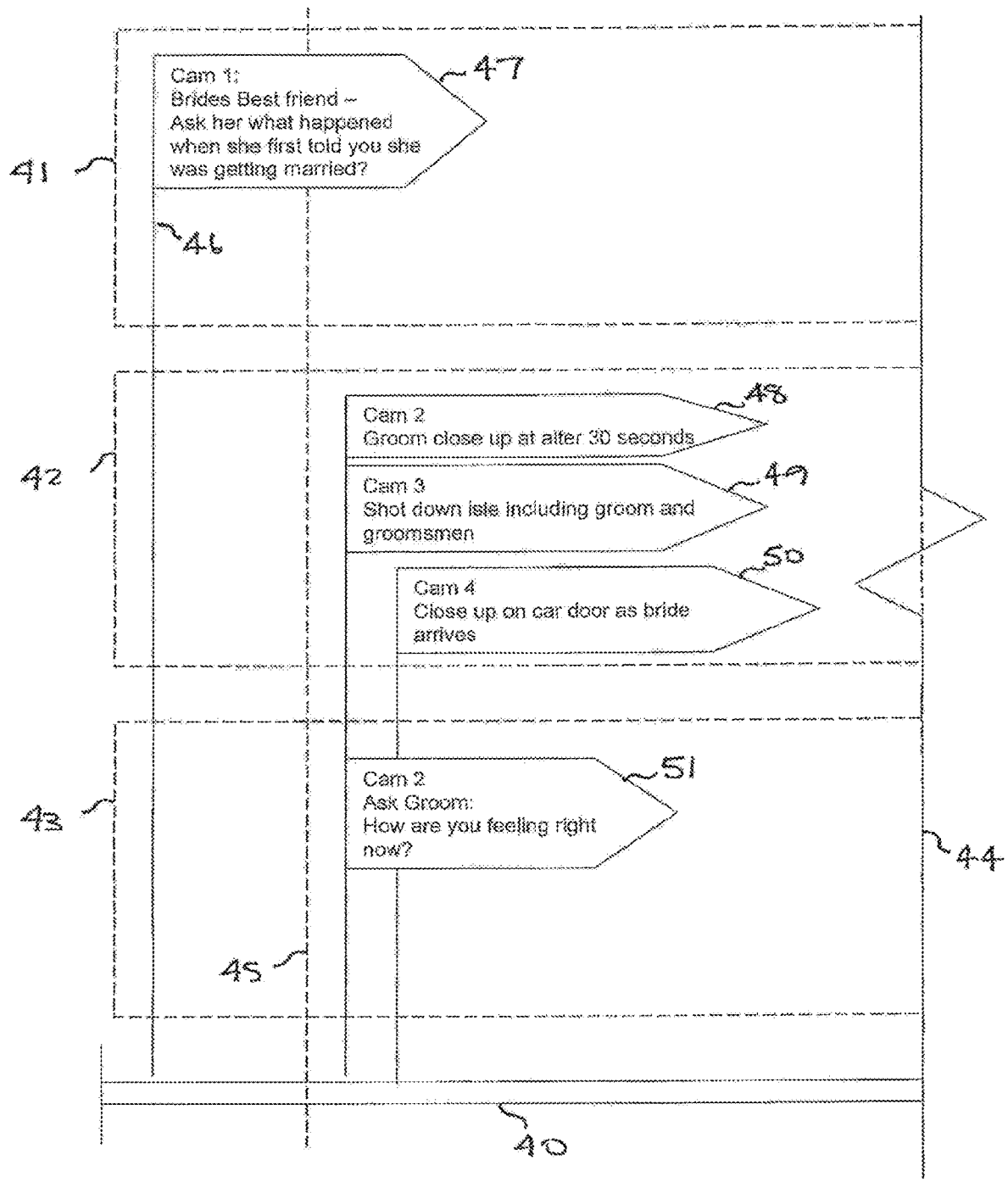
FIG. 3—Example timeline for a user script

FIG. 3 discloses a simplified example visualization of a script timeline 40 for a wedding. The figure only discloses a small segment of an actual timeline but is used for illustrative purposes. A vertical line 45 denotes a time segregation. In this case, the time before the dotted line 45 denotes an event anytime before the wedding day. The time after the time marker 45 denotes events that happen at the beginning of the wedding day.

Layered areas 41 42 43 denote different types of script activities. For example area 41 denotes shots or tasks related to interviewing persons related to the scripted event. In the example 47, the operator of camera one has been tasked with contacting the Bride's best friend and interviewing her about what happened when she told her that she was getting married. The event flag 47 is linked to the timeline by means of a flag marker 46.

The next area 42 related to shots or scenes that do not involve an interview. In this example shot descriptions and instructions are shown relating to activities inside the church 48 49 and outside the church as the Brides Limousine arrives 50.

Each shot or task flag incorporates a delegated operator who is responsible for collecting the content, a description of what to record and a context as to when the event should occur. For example the operator of Camera Two is assigned to capture a close-up of the face of the Groom 48 and then to record audio 51 from the audio area of the timeline 43 to capture the reaction of the Groom as to how he is feeling at that time 51.

The example in this figure is limited to a small segment of time 44 for the sake of simplicity and clarity.

Figure 4:
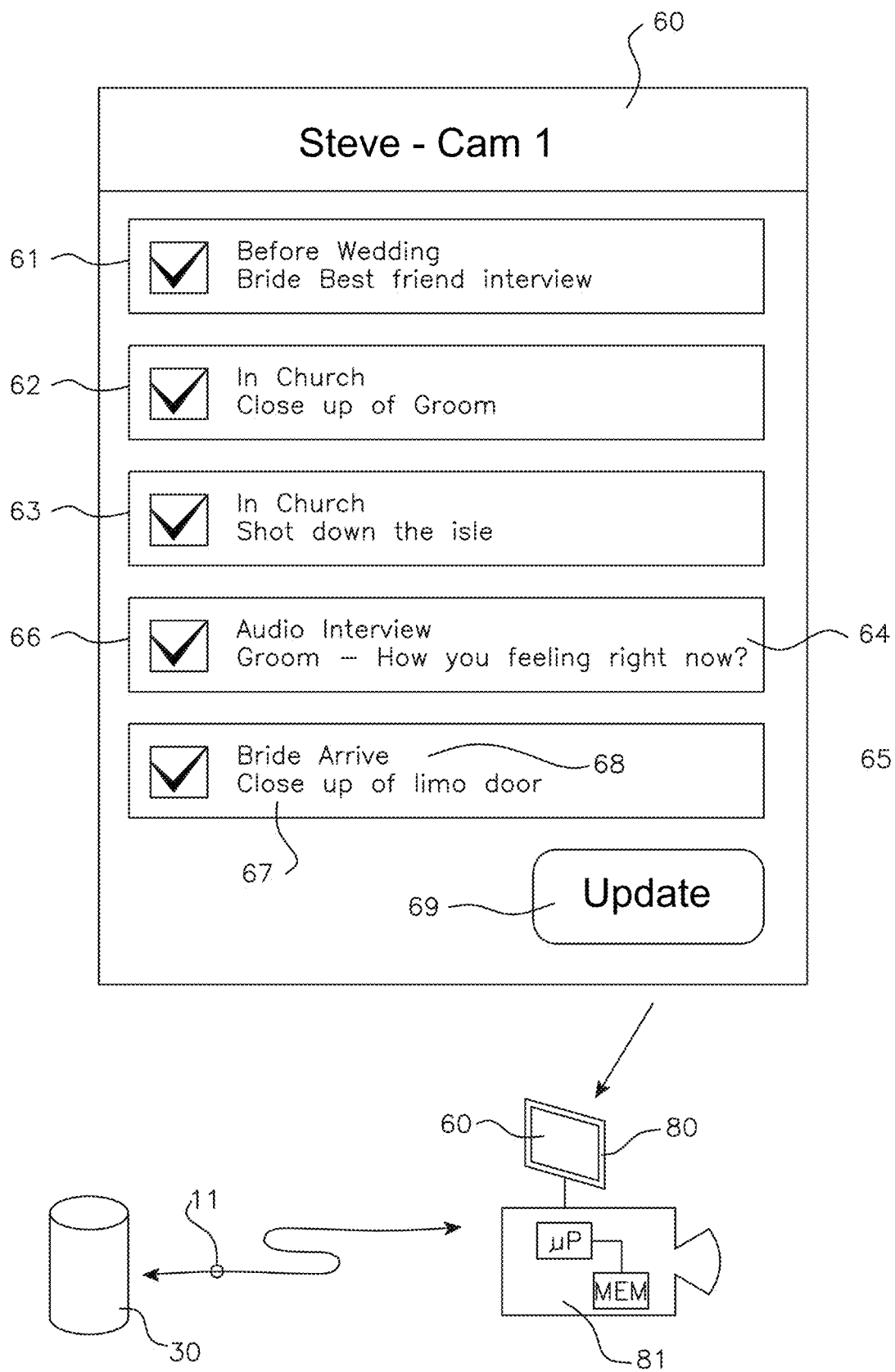
FIG. 4—Example of user interface for script shot and task list.
Figure 5A:
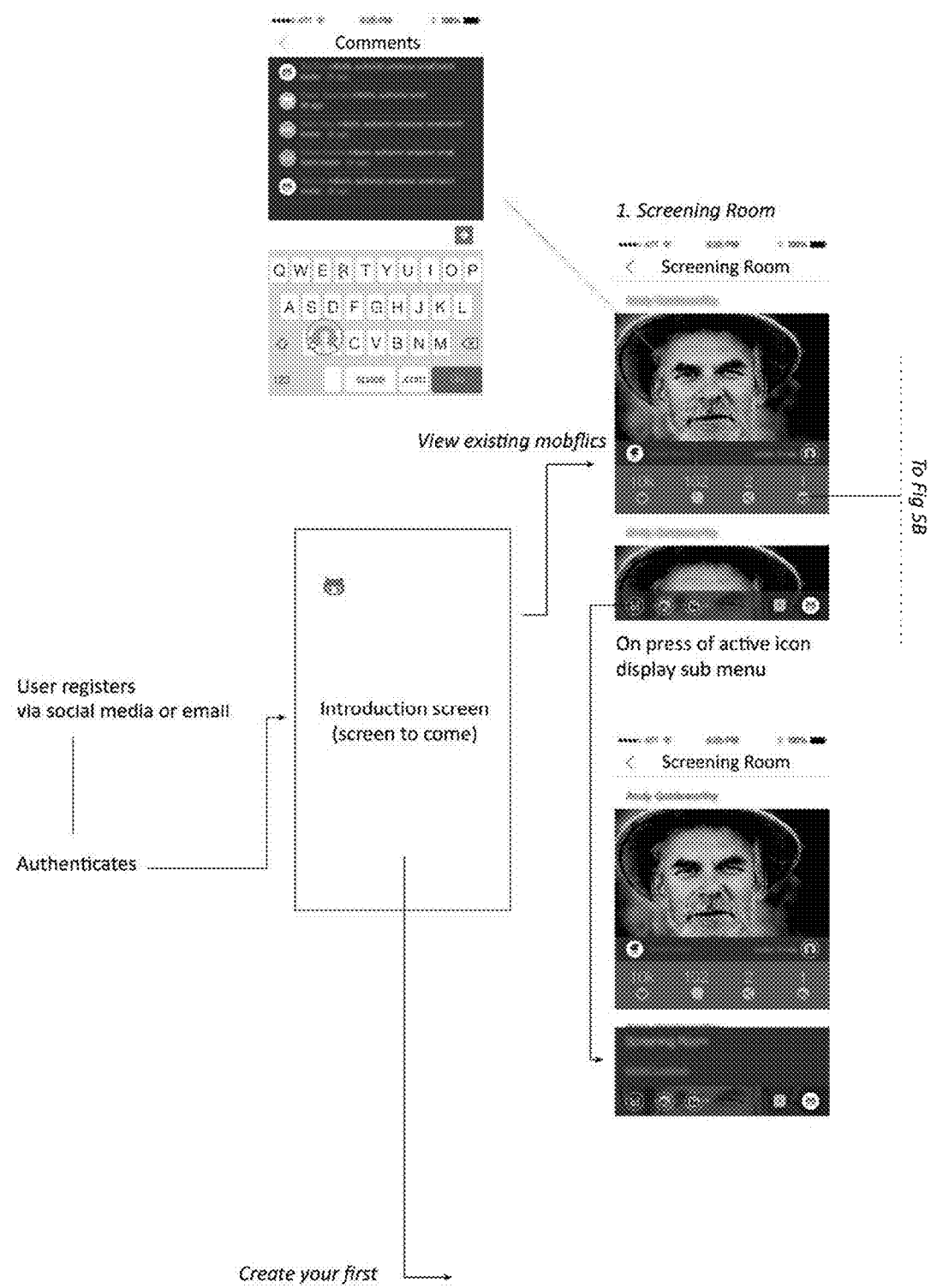
FIGS. 5A-5F are flow charts illustrating exemplary steps in and in an entire video production sequence.
Figure 5B:
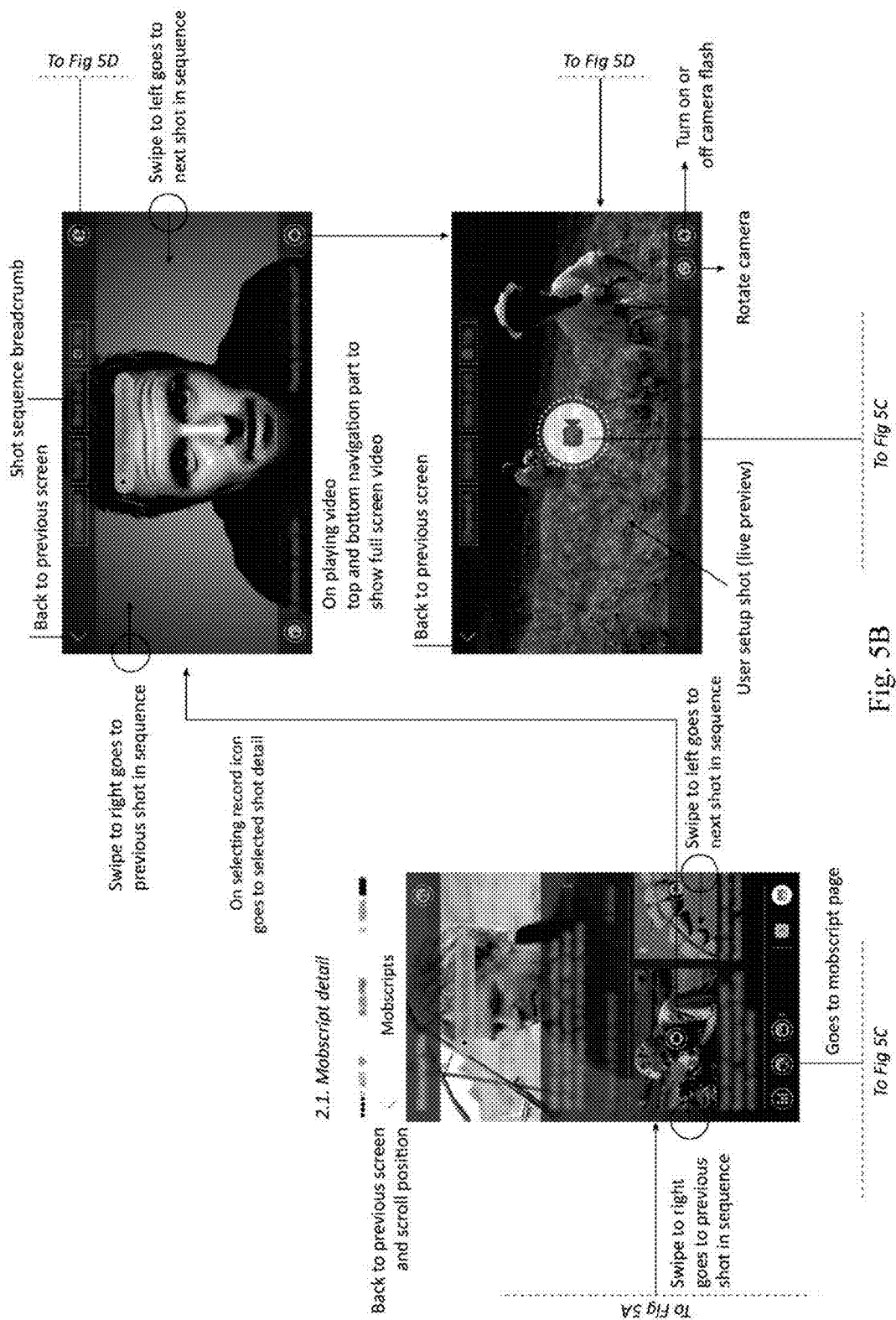
Figure 5C:
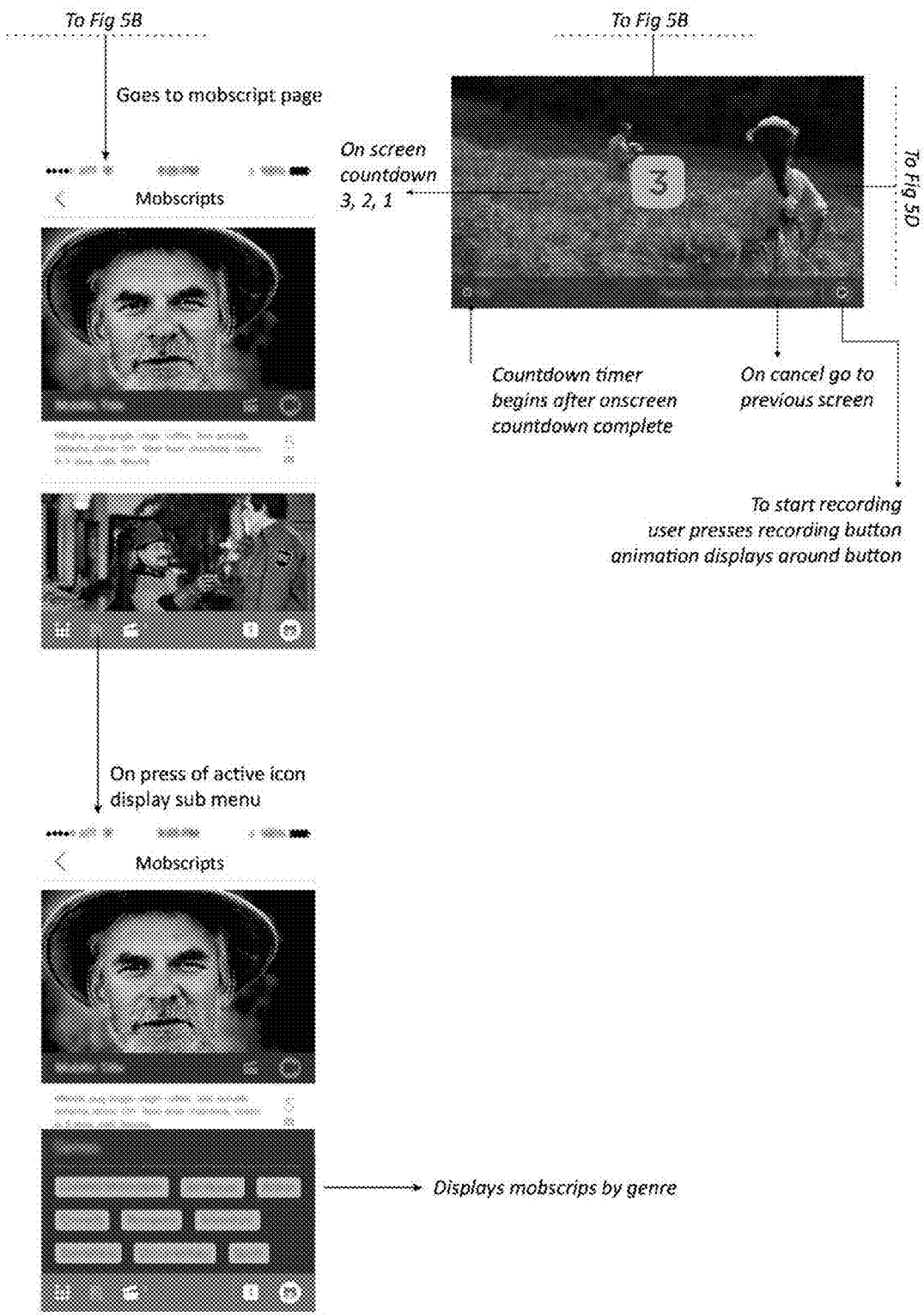
Figure 5D:
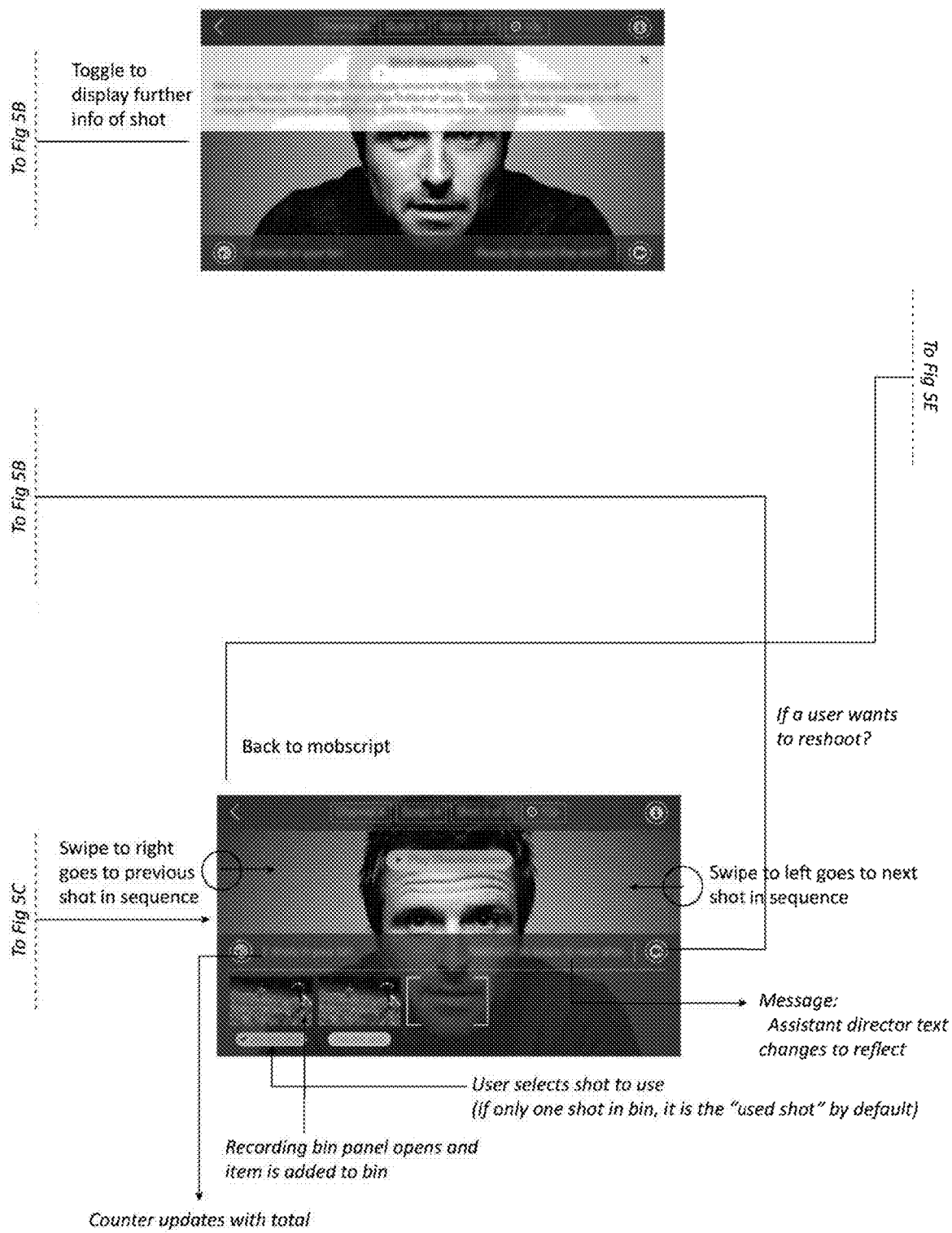
Figure 5E:
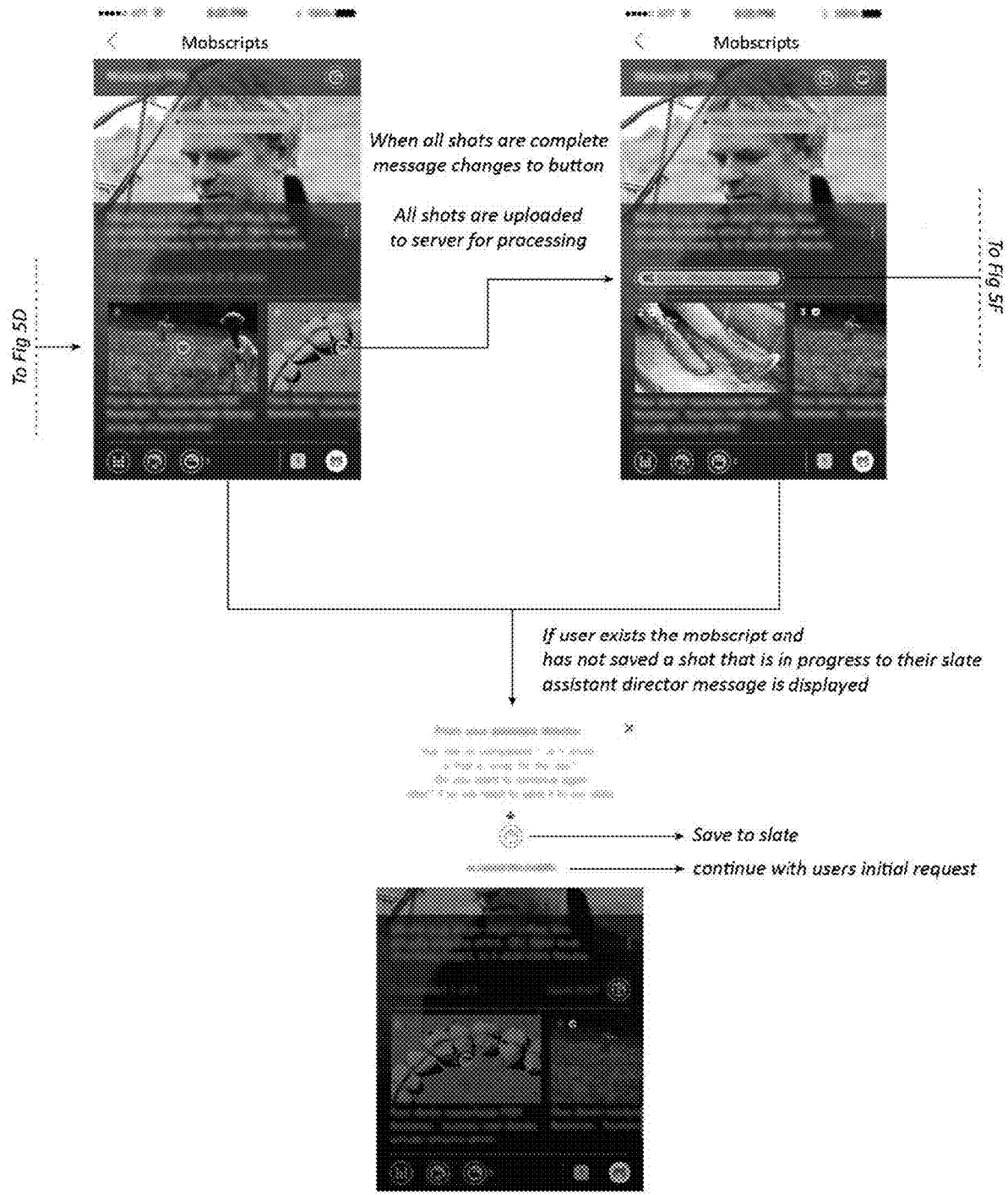
Figure 5F:
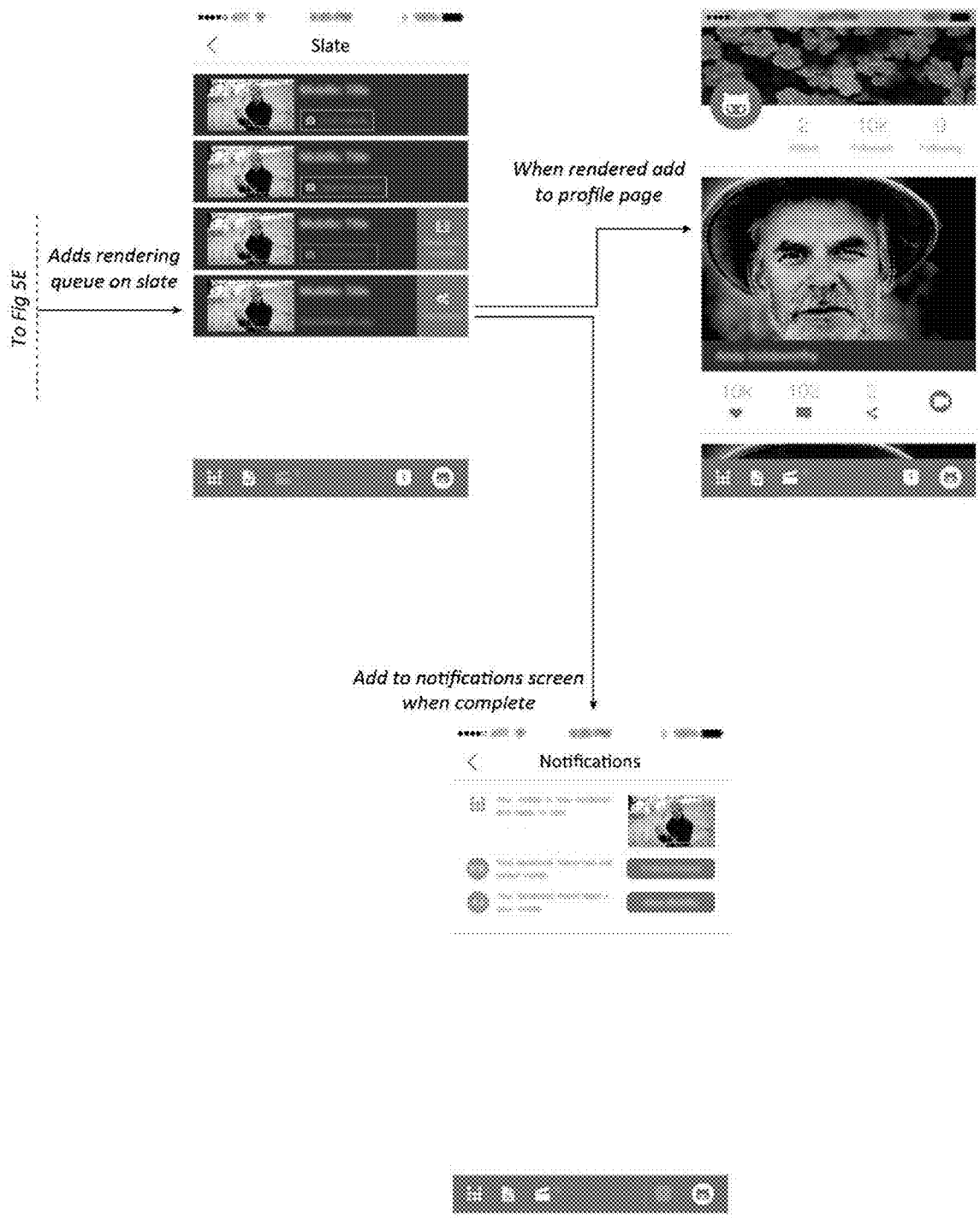

FIG. 4 gives an example of how a shot and task management application running on a smart device may look 60. The display 60 shows a list of shots and tasks 61 62 63 64 65. Each shot or task includes a location, time designator or cue 68 along with a simple summary of the action to be taken 67. A checkbox 66 along side each shot item or task item allows the contributing operator who is using the device to interact with the producing user and the video production server to volunteer or accept assignments as part of the script management process.

The described software application interface in FIG. 4 could be used for many other production related purposes but this example is shown to illustrate how an automated script management system could be used to interact with multiple contributing content producers.

The overall effect of the system is to allow users to systematically produce videos using high quality script templates, a content management system, content contributions from many contributing content producers and an online editing and publishing system to help people make quality video productions of events or occasions that are important to them.

Alternative Embodiments

The example embodiment uses a producing user and four contributing content producers to connect to a video production system that uses script templates and user input to generate a customized script, to manage the execution of that script, to edit the video and produced a finished video for publishing.

An alternative embodiment could have one or more publishing users, where none or more users are contributing content to the system, where the production system may be on a user's computer or on multiple computers over a network or over the Internet where application performing various tasks for the system are shared across multiple computers at different locations or where all the services are performed on one computer. Any part of the production process can be done separately or completed as part of the same production process.

The example of FIG. 3 is designed to help visualize how a script template could be converted into a customized script with the addition of specific locations and specific allocation of camera and contributing content producers. An alternative embodiment could use any type of content categorization not just limited to the audio, video and interview categories used in FIG. 3, it could also help visualize any script template, with any user modifications for any users using the system.

As further shown in FIG. 4 the steps in the process 61, 62, 63, 66 can be displayed on a digital input output device 80. In a particular preferred form the digital input output device 80 is associated with a video camera 81. More preferably the digital input output device is integrated with the video camera 81. In either instance the digital input output device communicates with the central production management application 30 (refer to FIG. 2) so as to receive the steps from the central production management application and send the required data in accordance with the selected steps including video data to the central production management application. In a particular preferred form the digital input output device 80 utilises a touch sensitive screen in order to make input more intuitive. In a particular form the digital input output device and video camera take the form of a smart phone which further includes integrated communication capability to transfer video content wirelessly to the central production management application.

FIG. 5 is a flow chart illustrating exemplary steps in an entire video production sequence making use of the video content derived from multiple smartphones whose video content generation is directed and orchestrated according to selected steps derived from the central production management application.

INDUSTRIAL APPLICABILITY

The system according to embodiments of the invention can be implemented utilising a combination of hardware and software. The software portions can run on servers preferably communicating over the Internet with a plurality of input output devices. In particular forms the input output devices comprise video and audio acquisition devices in the form of video cameras and the like.

The invention claimed is:

1. A system of automated script generation with integrated video production; said system comprising a video production server comprising an automated script generator and an integrated video producer,
   a plurality of content acquisition devices; each of the plurality of content acquisition devices being operable by a respective one of a plurality of operators; at least one of the plurality of content acquisition devices being operable as a production device by the producing user; each of said plurality of content acquisition devices communicating over the Internet to said video production server; each of said plurality of content acquisition devices including a video acquisition device, audio acquisition capability and an input output device; each of said plurality of content acquisition devices being operable in conjunction with the input output device to act as either a content acquisition device or a production device; each of the plurality of content acquisition devices being configured and arranged to receive the communications generated by the automated script generator and comprising means by which an operator of the plurality can indicate whether each of the shots or tasks is accepted whereby respective operators of the content acquisition devices can receive the communications generated by the video production server and can communicate to the video production server and advise as to which shots or tasks the respective operators will accept, and each of the content acquisition devices comprises an application for facilitating communication and coordination with the video production server such that the shots or tasks generated by the video production server can be communicated and coordinated through the application and displayed on each of the content acquisition devices.

2. The system of claim 1 wherein the video production server is configured and arranged to store a master script template for capturing an event or occasion by a number of cameras and operators to make a video production, wherein the master script template is written so that the (Master) Script Template is customizable with modification of a plurality of factors, including the number of cameras, operators capturing the event or occasion, image analysis, object detection and classification, activity identification, face detection, emotion/sentiment and voice analysis.

3. The system of claim 1 wherein the server is configured to generate communications, including a script timeline, and a list of shots or tasks, wherein for each of the shots or tasks the list includes (i) a location, time designator or cue; and (ii) a summary of action to be taken.

4. The system of claim 1, further comprising content acquisition devices, wherein each of the content acquisition devices is a video camera.

5. The system of claim 4, further comprising content acquisition devices, wherein each of the content acquisition devices further includes audio acquisition capability.

6. The system of claim 1, further comprising content acquisition devices, wherein the content acquisition device is operable in association with an input output device.

7. A method of automated script generation with integrated video production; said method comprising providing the system of claim 1 and utilizing the system to perform the following steps: assembling a script comprising a series of visual cues and guidelines for the video production from the script template communicating the series of steps for the video production to a central production management application; communicating selected of the series of steps to said content acquisition devices; actuating said content acquisition devices so as to give effect to said selected series of steps; communicating at least video content thus acquired by following said series of steps to said production management application; integrating said video content thus acquired with content derived by giving effect to others of said series of steps thereby to produce resultant video output content.

8. The method of claim 7 wherein said a script is assembled comprising a series of steps for the experience, storytelling and for video production.

9. The method of claim 7 wherein said step of integrating includes one or more of editing, trimming, adding musical composition or rendering the content with postproduction effects.

10. The system of claim 7, wherein each of said content acquisition devices is used for content generation, and is also used by users of the system to interact with the video production server.

11. The system of claim 1 wherein the video production server a series of professionally written, supplied or automatically generated script templates for a wide range of events or occasions, such as but not limited to weddings, anniversaries, graduation or holidays is produced and stored for use by the users of the system.

12. The system of claim 1, further comprising content acquisition devices, wherein each of the content acquisition devices is a smart device.

13. The system of claim 12, wherein the smart device is a smart phone.

14. The system of claim 12, wherein the smart device is a mixed reality/augmented realty device such as smart glasses.

15. The system of claim 12, wherein the smart device can indicate whether each of the shots or tasks has been completed.

16. The system of claim 1, further comprising content acquisition devices, wherein each of the content acquisition devices accesses the video production server.

17. The system of claim 1, further comprising content acquisition devices, wherein each of said content acquisition devices includes a video camera.

18. The system of claim 1, wherein the video production server is constructed and arrange to enable the producing user to craft his or her own script timeline using the automated script generator.

19. A system of automated script generation with integrated video production; said system comprising a video production server comprising an automated script generator and an integrated video producer, wherein the server is configured to enable a producing user of the system to interact with the video production server to customize the video production by (i) modifying the plurality of factors, including the number of cameras and operators, and (ii) defining names of the operators, equipment availability, date of equipment availability, anticipated weather conditions, location details, skill of operator, event and a role of operator, the role selected from a list of possible roles that includes a tour guide and a camera operator.

20. The system of claim 19, further comprising content acquisition devices, wherein each of the content acquisition devices is a smart device.

21. The system of claim 20, wherein the smart device is a smart phone.

22. The system of claim 20, wherein the smart device is a mixed reality/augmented realty device such as smart glasses.

* * * * *